United States Patent
Dullien et al.

(10) Patent No.: US 7,767,239 B1
(45) Date of Patent: Aug. 3, 2010

(54) METHODS AND FORMULATIONS FOR HYDRATING DRY SKIN, EMPLOYING A LOW-ENERGY BEVERAGE

(75) Inventors: Robert C. Dullien, Boulder, CO (US); Vivian Dullien, Boulder, CO (US)

(73) Assignee: Dullien Associates, LLC, Boulder, CO (US)

( * ) Notice: Subject to any disclaimer, the term of this patent is extended or adjusted under 35 U.S.C. 154(b) by 0 days.

(21) Appl. No.: 11/986,407

(22) Filed: Nov. 21, 2007

Related U.S. Application Data

(63) Continuation of application No. 10/400,962, filed on Mar. 27, 2003, now abandoned, which is a continuation-in-part of application No. 09/802,733, filed on Mar. 9, 2001, now abandoned.

(60) Provisional application No. 60/188,102, filed on Mar. 9, 2000.

(51) Int. Cl.
*A23L 1/30* (2006.01)
*A61K 8/02* (2006.01)
*A61K 47/00* (2006.01)

(52) U.S. Cl. ............ 426/72; 424/401; 424/439
(58) Field of Classification Search .......... None
See application file for complete search history.

(56) References Cited

U.S. PATENT DOCUMENTS 5,480,865 A * 1/1996 Kingham .......... 514/2
6,051,236 A * 4/2000 Portman .......... 424/725

* cited by examiner

*Primary Examiner*—Humera N Sheikh

(57) ABSTRACT

There are disclosed beverages for the maintenance of healthy, hydrated skin and the avoidance of dry skin and related problems, for mammals, particularly human beings, comprising whey protein, electrolytes, vitamin C and, optionally, aspartame with a low concentration of sugar, typically 4.15 g sugar per 237 ml serving, and a ratio of sugar to protein of typically 1.1:1. Also disclosed are methods for maintaining healthy skin and repairing dry skin by administering these beverages either alone or in conjunction with external topical moisturizers.

4 Claims, No Drawings

METHODS AND FORMULATIONS FOR HYDRATING DRY SKIN, EMPLOYING A LOW-ENERGY BEVERAGE

REFERENCE TO RELATED APPLICATIONS

This application is a continuation of my U.S. application having Ser. No. 10/400,962, filed Mar. 27, 2003 now abandoned, which is a continuation in part of and claims priority from U.S. application Ser. No. 09/802,733, dated Mar. 9, 2001 now abandoned, which claimed the benefit of my provisional application having Ser. No. 60/188,102, filed Mar. 13, 2000, now abandoned.

FIELD OF THE INVENTION

The present invention is directed to a nutritional fluid composition and methods for its administration in order to hydrate the body with emphasis on hydrating the skin in a superior manner and thereby helping maintain healthy skin and improve dry skin. More particularly, the composition includes sugar, whey protein, electrolytes, the antioxidant vitamin C, magnesium, and, optionally, aspartame, in water, where the concentration of sugar is about 1.7% by weight, and the ratio of sugar to protein is approximately 1.1:1, and its administration includes a regimen that involves the temporary avoidance of other foods and beverages, and the optional use of external topical moisturizing lotions or creams.

BACKGROUND OF THE INVENTION

Climate conditions as well as the normal aging process limit the ability of the outer layer of the skin to maintain water. This outer layer of the skin, the stratum corneum ("SC") of the epidermis, is the non-living skin barrier between the environment and the body.

Externally applied topical lotions, creams and oils intended to moisturize the skin ("external moisturizers"), sometimes embedded in other cosmetics, attempt to hydrate the SC but cannot penetrate this barrier to create a significant improvement in the ability of the skin to increase water content.

Most skin care is concerned with taking care of the SC. This outer skin layer is about 20 cell layers thick and is replaced every 3 to 4 weeks by the body. This layer needs the correct amount of internal water to remain supple and free of problems. A moist SC is flexible, smooth, and translucent. A dry SC dull, flaked and crinkled. External moisturizers may help the appearance of the top layers but have little effect on the deeper layers of the skin, including the deeper layers of the SC, and the living layers of the epidermis and dermis.

Aging and the environment can cause the SC to significantly lose its moisture-holding ability. Plumpness, strength, and resiliency of the deeper part of the skin also diminish. The result is a real increase in surface dryness as well as in crinkling, wrinkling and sagging of skin.

Accordingly, a need exists for products and methods that provide significant improvement in the ability of the skin, in particular, the SC, to increase and retain its water content. A further need exists comprising the moisturization of parts of the skin which are not easily treated using external topical moisturizing creams and lotions. Thus it is beneficial to provide a skin moisturization method in the form of an internally taken composition which addresses the entire body.

DESCRIPTION OF PRIOR ART

Products and methods that have aimed to improve the skin from the inside of the body through improved hydration have been in the past comprised of the consumption of foods or nutritional compositions which contain certain fats, oils and fatty acids, including omega-3 fatty acids, such as salmon, trout, cod liver, their oils and various other fish oils, flaxseed oil and various other seed oils. These have been mostly unpalatable and their effectiveness has been questioned. Even if they work for some users, continual, everyday, consumption of an item such as for example, salmon, or cod liver oil, may pose a problem for most people. Compositions that rely on fats, oils or fatty acids for skin condition maintenance or improvement do not directly relate to the fluid composition of the present invention (the "Beverage"), which does not rely on such ingredients.

Products for the hydration of the entire body from the inside have been focused on electrolyte replacement. Such products have been demonstrated to provide more rapid hydration than water. They were not intended for skin moisturization, thus they cannot be considered prior art in a direct sense. There is the question whether to a person who is knowledgeable in the field of nutrition it would have been obvious how to adapt one or more sports or nutritional drinks that are aimed at body hydration to skin condition maintenance. This question is best answered by looking at some facts.

Proteins, sugars, electrolytes and vitamin C, the principal ingredients of the present invention, are jointly present in many products. These ingredients are considered essential for various nutritional purposes. The essence of the current invention is that no other product on the market, and no existing patent, has introduced the low amount of sugar(s) present in the present invention, specifically for the maintenance of healthy skin and the improvement of dry skin. The area of sports drinks comes closest in terms of formulation, although not utility or purpose, and is discussed in the following.

Sports drinks, some of which contain the ingredients of the present invention, provide a substantial amount of energy (typically over 90 calories per serving, up to several hundred calories). For example, U.S. Pat. No. 6,051,236 to PORTMAN discloses a composition to help replace water lost during exercise and enhance muscle cell repair. The stated ratio of carbohydrates to proteins is in the range of 2.8 to 4.2:1. The commercial products based on this patent, Accelerade® and Endurox R$^4$®, have 140 and 270 calories per 12 fl oz serving, respectively, and sugar to protein ratios of 2.8:1 and 2.2:1, respectively. It is not surprising that Accelerade® has 12 g sugar in 237 ml of drink and Endurox, 19.3 g. According to public information provided by the manufacturer of Accelerade® and Endurox R$^4$®, "But unlike a conventional sports drink, ACCELERADE contains the patented 4 to 1 ratio of carbohydrate to protein to speed the movement of carbohydrate energy into the muscle, and the ideal combination of simple and complex carbohydrates for rapid and sustained energy" and "Endurox R$^4$ is more than a sports drink. It is an advanced nutritional system proven to dramatically enhance exercise performance and speed recovery . . . Endurox R$^4$ contains the patented 4 to 1 ratio of carbohydrate to protein to speed muscle glycogen replenishment and rebuild muscle protein after exercise, antioxidants to reduce post-exercise muscle damage and glutamine to help reduce muscle stress". The 4:1 ratio of carbohydrates to proteins is called the "Optimal Recovery Ratio". These facts indicate that the Portman patent is applied to products in the sports nutrition area, which is distinct from the skin condition maintenance area.

Our trial using Accelerade® and Endurox $R^4$® for the avoidance of dry skin showed that usage of these products was not found to provide adequate hydration to the skin. On the contrary, we found them to allow the skin to become dry and cracked. Thus, the Portman formulas do not hydrate the skin, nor do they heal skin cracks.

A further support for the non-obviousness of the present invention is our extensive research involving in-depth discussions with skin care experts, sports drink experts, food & nutrition experts, athletes and study volunteers which concluded that no other person or persons have considered the use of a drink such as the present invention for skin maintenance, whether such drink be based on the Portman patent, or anything similar or derived from it through an alteration of Portman's formulas. There is no prior art, including any commercial product, for the hydration of the entire body that would involve essentially a major alteration of Portman's formulas by reducing the amount of sugar and other carbohydrates per unit of water significantly and thereby bringing the concentration of sugar to the levels of instant invention, and the ratio of carbohydrate to protein closer to 1:1.

A further distinction between the present invention and sports drinks is in the concentration of sodium. The amount of sodium is also considerably greater in beverages aimed at the sports market, than in the present invention. As examples, Accelerade(r) contains 127 mg of sodium per 8 oz (237 ml) and Gatorade, 110 mg of sodium. The present invention contains 31.7 mg per 8 fl oz, which is 25% of the amount in Accelerade(r) and 29% of the amount in Gatorade. These constitute substantial differences in sodium content. The typical user of the present invention does not need the additional sodium provided by sports drinks. The reason for having so much more sodium in sports drinks than in the present invention is that sodium is provided not just as an electrolyte for enabling faster fluid transport across cell membranes but also to replace sodium lost through sweating due to exercise. Table 1 below provides a comparison of the present invention with a number of sports drinks.

TABLE 1

Key Components for HydroVi and Several Sports Drinks of Interest, per Manufacturer*

| | Unit | HydroVi** | Accelerade | Endurox R4 | Hydra Fuel Powder | Hydra Fuel Liquid | Pure Pro | Sharkade | Cutting Force | Soy Moo (Fat Free) | MetRx Powder | Unipro Perfect Protein | MLO Super High Protein |
|---|---|---|---|---|---|---|---|---|---|---|---|---|---|
| Fluid oz | | 8.00 | 12.00 | 12.00 | 8.00 | 16.00 | 22.00 | 8.00 | 18.00 | 8.00 | 16.00 | 6.00 | 8.00 |
| Biotin | | | | | | | | | | | | | |
| Calcium | mg | 75.00 | 60.00 | 100.00 | | | | | | | 1000.00 | 95.00 | 150.00 |
| Calories | | 32.00 | 140.00 | 270.00 | 66.00 | 140.00 | 160.00 | 90.00 | 40.00 | 70.00 | 250.00 | 76.00 | 100.00 |
| Carbohydrate | g | 4.26 | 26.00 | 53.00 | | 34.00 | | 21.00 | 10.00 | 9.00 | 22.00 | 1.00 | 1.00 |
| of which Sugars: | g | 4.15 | 18.00 | 29.00 | 17.00 | 33.00 | | 11.00 | 10.00 | 8.00 | 3.00 | | 1.00 |
| Chloride | | 49.00 | | | 39.00 | | | | | | | | |
| Cholesterol | mg | 0.45 | 5.00 | 10.00 | | | 5.00 | | | 0.00 | 15.00 | | |
| Choline chloride | mg | | | | | | | | 100.00 | | | | |
| Chromium | mcg | | | | 13.00 | | | | 204.00 | | | | |
| Fat | g | 0.22 | 1.00 | 1.00 | | | | 0.00 | | 0.00 | 2.00 | | 0.00 |
| Fiber, Dietary | | | | | | | | | | | 1.00 | 1.00 | |
| Folate | mg | | | | | | | | | | 200.00 | | 70.00 |
| Guarana extract | mg | | | | | | | | 55.00 | | | | |
| Inositol | mg | | | | | | | | 50.00 | | | | |
| Iodine | mg | | | | | | | | | | 60.00 | | 52.50 |
| Iron | mg | | | | | | | | | | 4.50 | | 3.50 |
| L-carnitine | g | | | | | | | | 1.00 | | | | |
| Magnesium | mg | 0.90 | 123.00 | 250.00 | 13.00 | | | | | | 189.00 | 14.00 | 126.00 |
| Niacin | mg | | | | | | | | | | 19.00 | | 6.65 |
| Phosphate | | 314.00 | | | 120.00 | | | | | | | | |
| Phosphorus | mg | | | | | | 1700.00 | | | | 630.00 | 38.00 | 140.00 |
| Potassium | mg | 112.00 | 64.00 | 120.00 | 50.00 | 99.00 | 140.00 | 65.00 | 90.00 | | 900.00 | 48.00 | 70.00 |
| Protein | g | 3.65 | 6.50 | 13.00 | | 0.00 | 40.00 | 0.00 | | 8.00 | 37.00 | 16.00 | 22.00 |
| Riboflavin | mg | | | | | | | | | | 1.02 | | 0.60 |
| Selenium | mg | | | | | | | | | | 28.00 | | |
| Sodium | mg | 32.00 | 190.00 | 220.00 | 25.00 | 50.00 | 280.00 | 75.00 | 50.00 | 120.00 | 370.00 | 88.00 | 290.00 |
| Stevia extract | mg | 72.80 | | | | | 200.00 | | | | | | |
| Thiamin | mg | | | | | | | | | | 0.90 | | 0.53 |
| Vitamin A | mg | | | | | | | | | | 900.00 | | 350.00 |
| Vitamin B12 | mg | | | | | | | | | | 1.00 | | 0.70 |
| Vitamin B6 | mg | | | | | | | | | | 1.20 | | 0.70 |
| Vitamin C | mg | 8.50 | 120.00 | 470.00 | 30.00 | 60.00 | | | 2.00 | | 60.00 | | 21.00 |
| Vitamin D | mg | | | | | | | | | | 3.00 | | |
| Vitamin K | mg | | | | | | | | | | 40.00 | | |
| Zinc | mg | | | | | | | | | | 6.00 | | 5.25 |

NOTES:
*Some numbers were derived, as when recommended dietary allowance was given, not the absolute weight.
**Present invention.
The above-named products are trademarks.

Accordingly, prior art has not met the need for internal hydration of the body that is sufficient for maintaining skin health through internal moisturization, and for improving dry skin. The invention presented in the following addresses that need.

SUMMARY OF THE INVENTION

The present invention provides for a formulation for a fluid nutritional composition that is consumed as a beverage (the "Beverage"), related kits, and methods that provide hydration to the skin from the inside out. An alternative formulation is also provided. The latter involves the use of aspartame, a compound that many users prefer to avoid. It has been shown that the Beverage is more effective for maintaining healthy skin and improving dry skin when it does contain aspartame.

One object of the invention is to provide a formula for a beverage that provides enhanced skin hydration from the inside out, comprising by weight about 95.8% water, about 1.73% sugar, about 1.52% whey protein, about 0.10% aspartame-based sweetener (see Examples), about 0.13% phosphate, about 0.047% potassium, about 0.032% calcium, about 0.020% chloride, about 0.013% sodium, about 0.0035% vitamin C and about 0.0004% magnesium, where the use of the aspartame-based sweetener is optional. Another object of the invention is to provide methods for enhancing skin hydration or treating dry skin comprising the Beverage of the invention and a regimen for employing the Beverage.

Translated to actual weights per 8 fl oz (237 ml) of the Beverage, the above percentages provide the following amounts: about 230 ml water, 4.15 g sugar, 3.65 g whey protein, about 0.25 g aspartame-based sweetener, 314 mg phosphate, 112 mg potassium, 76 mg calcium, 48.9 mg chloride, 31.7 mg sodium, 8.5 mg vitamin C and 1.0 mg magnesium, where the use of the aspartame-based sweetener is optional.

Still another object of the invention is to provide kits for enhancing skin hydration or treating dry skin, comprising the Beverage of the invention and an external moisturizer, and a regimen for employing these kits. The external moisturizer may be selected by the user based on personal preference (see Examples).

These and other objects will be clear in light of the detailed description below.

All percentages herein are by weight unless otherwise specified.

DETAILED DESCRIPTION OF THE PREFERRED AND ALTERNATE EMBODIMENTS

The present invention provides a beverage, intended to be taken according to a regimen to be described below, to hydrate dry skin from the inside of the body, and to help build better, moister, skin and to retain healthy, moist skin.

One embodiment of the invention is a beverage comprising water, sugar, protein, electrolytes (including sodium, potassium, calcium, magnesium, chloride and phosphate), vitamin C, where the ratio of protein to sugar is approximately 1.1:1 by weight, and the concentration of sugar in the Beverage are significantly lower than in drinks that are typically classified as soil (non-diet), sports, energy, bodybuilding, nutritional or weight loss drinks; or juices or smoothies.

An alternate embodiment of the invention is a beverage comprising water, sugar, protein, electrolytes (including sodium, potassium, calcium, magnesium, chloride and phosphate), vitamin C and aspartame, where the ratio of protein to sugar is approximately 1.1:1 by weight, and the concentration of sugar in the Beverage are significantly lower than in drinks that are typically classified as soft (non-diet), sports, energy, bodybuilding, nutritional or weight loss drinks; or juices or smoothies.

Yet another alternate embodiment of the Beverage is the use of phosphoric acid instead of, or in addition to, the use of phosphates, so as to provide the same % by weight of elemental phosphorus as the embodiment that uses phosphate alone, with no other changes necessitated by this substitution.

A further embodiment of the Beverage is comprised of the ingredients, with the exception of water, being provided in dry powder form. The user needs to mix that powder mix with water according to the instructions given, to create the Beverage. In the discussion that follows, the drinkable Beverage is addressed, but it is understood that the method of formulation can be either ready-to-drink or dry powder form, with the user completing the process of making up the Beverage. Being able to provide the ingredients for the Beverage, apart from the water component, in dry powder form, is an essential component of the invention. Instead of dry powder, the ingredients that would be in the dry powder form may also be provided to the user in syrup or tablet form. The syrup form would enhance the process of combining with water, as dry mixes, which contain whey protein, are subject to the formation of globules, while syrup is not. The tablet form would create a dosage that would be the right amount for an appropriate amount of water, enabling the accurate mixing up of smaller amounts of the Beverage.

The Examples below indicate the composition of the Beverage.

The concentration of sugar in the present invention is about 1.7% by weight (4.15 g per 237 ml). The concentration of sugar in soft drinks is about 5 (five) times that much. The optimal concentration of sugars in a sports drink, according to the Gatorade® web site is 6%.

The use of significantly less sugar in present invention is a necessary part of the invention. Our experiments have shown that the transport of the Beverage toward the dry skin cells of the body occurs in a significantly more efficient manner when the concentration of sugar and protein is low, than when it is high. Higher amounts of sugar(s) are requirements for replenishing lost energy and, in the case of Portman, "enhancing muscle cell repair", but are counter to the teaching of this patent application whereby optimal hydration of dry skin cells occurs with low concentrations of sugar.

An addition in this continuation-in-part application to the parent is the use of aspartame (provided by one of a number of alternative aspartame-based sweeteners please see Examples below), to significantly enhance the effectiveness of the present invention. We found that leaving it out decreased skin hydration in most volunteers (4 out of five), while putting it back into the formula provided the same volunteers with significantly better skin hydration. Skin hydration and improvement or maintenance was still observed with no aspartame. Both products have been on the market, and have found acceptance among many satisfied customers who use them for skin hydration. It is important to provide both products since many customers avoid the use of aspartame.

The Beverage of the present invention can be used in conjunction with an external moisturizer to provide more rapid improvement of dry skin, particularly skin cracks and fissures. The Beverage enhances the effect of external moisturizers. Thus, consumption of the Beverage can be followed or preceded by the application of an external moisturizer. The Beverage of the present invention provides enhanced moisture to the skin from the inside, while the external moisturizer aids in the prevention of water loss through the skin. The combination of the Beverage and an external moisturizer comprises a kit for moist skin condition maintenance or dry skin improvement. The external moisturizer can be selected by the user based on personal preference.

The Beverage needs to be taken on a regular schedule for a period of at least four days to heal problems of dry skin such as skin cracks, fissures, eroded or bloody fingertips, chapped lips, dry eyes, skin scaling or to improve and speed up the delivery and/or absorption of nutrients, water, added drugs and/or other therapies to the body of any mammal, including especially of humans. Moreover, an important aspect of the regimen is that the Beverage needs to be taken at least 20 minutes before or about an hour after the consumption of food or other beverages. It is a significant aspect of the invention that the body not confuse it with foods. The absolute concentration of protein, sugars and electrolytes in water is also a significant aspect of the invention, thus the alteration of these concentrations in the body through the drinking of another beverage within minutes of drinking the Beverage must be avoided.

The nutritional fluid composition of the invention is to be applied according to a regimen which is presented below.

Operation of the Present Invention

Molecules of the Beverage of the present invention, in the concentrations in the formula, help "drag" water molecules into cells, including the skin, through osmosis and other bodily mechanisms. If the concentration of sugar in a beverage is too high, they actually cause water to leave cells causing dehydration. The same is true if the concentration of protein is too high.

The Beverage is based on evidence that suggests that certain water-soluble materials, such as whey protein, amino acids, organic acids, and inorganic ions (osmolytes) and vitamin C are primarily responsible for the maintaining the water-holding properties of the stratum corneum (SC). The composition of claim 1 provides a means of delivering materials, including osmolytes, through osmosis and other mechanisms.

This formulation can be applied to liquid, ready-to-drink version of the Beverage; a powder version that needs to be dissolved in a specified amount of water; a concentrate or syrup version that needs to be diluted using a specified amount of water; and any other version such as tablet, gel, etc. where dilution per instructions will result in the formulations outlined in the Examples and the claims.

The Beverage described herein does not exclude optional natural or artificial flavorings, colors and preservatives. One or more of the foregoing is generally used to improve the appeal and shelf life of the Beverage. In particular, appropriate amounts of citric acid and stevia are used in the dry powder formulation, and stevia, sodium benzoate and potassium sorbate are used in appropriate amounts in the ready-to-drink liquid formulation.

The Beverage differs from soft (non-diet), sports, energy, bodybuilding, nutritional or weight loss drinks; or juices or smoothies in the significantly lower concentrations of protein, sugars and/or electrolytes. A key corollary is significantly lower calories per 8 ounce serving: 32 calories in the commercial product.

The use of the Beverage by itself, according to a regimen that involves consumption of 2-4 servings a day, at least 20 minutes before or 1 hour after eating or drinking anything else, for 4-7 days at a time, provides the skin with a source of internal water, protein, electrolytes and vitamin C, optionally also the amino acids phenylalanine and aspartic acid, and significantly enhances the ability of the body to retain healthy, moist skin and to eliminate dry skin and related problems.

The use of the Beverage with an external moisturizer, as desired by the user and feasible, enhances the effects of the Beverage for the improvement of dry skin, particularly cracked or fissured skin on fingers and feet. The Beverage helps attain an increase in the water content of the skin, while external moisturizers prevent evaporation of moisture through the SC.

The use of the Beverage also reduces the occurrence of chapped lips, reduces discomfort some have with contact lenses and reduces vaginal dryness.

The Beverage of the invention combines three important hydrophilic groups: carbohydrates, protein and electrolytes in combination(s) that offer low calories and relatively low amounts of sugar, protein, sodium and chloride (the latter two provided in the commercial product through salt).

The Beverage of the invention is biologically active at the living layer of the skin, the deeper epidermis and dermis, hydrating from inside the body. The beverage differs from soft, sports, energy, bodybuilding, nutritional or weight loss drinks; or juices or smoothies and milk, which were not found to promote healing of skin problems or to help avoid dry skin.

The Beverage is a combination of electrolytes and sugar that provides rapid water delivery and absorption in the body, especially the skin, and through that mechanism, aids in skin building, repair and satisfactory skin health.

The potassium used in the Beverage can be provided by potassium phosphate (dibasic-anhydrous) or in the form of citrate and/or sorbate salts.

The phosphate used in the Beverage of the invention can be derived from potassium phosphate (dibasic-anhydrous), or calcium phosphate (dibasic-anhydrous) or a combination of the foregoing.

Calcium used in the Beverage can be derived from a number of sources, including calcium phosphate.

Chloride and sodium are derived from table salt.

A pilot study was conducted to determine the effects of the use of the Beverage daily for over three months. The following is a summary of that study:

Pilot Study Summary

Study duration: Nov. 10, 1999 to Jun. 30, 2000

Objective: To record the moisturizing effect of single and multiple doses of the Beverage.

Design: Open pilot, self-reporting in 17 volunteers.

Material and methods: Beverage formulated as per patent application. Ingredients include water, protein, electrolytes, sugar, calcium, vitamin C and phosphorus. Each volunteer filled out a case report form.

Demographics: One volunteer dropped from the study because she had the stomach flu at the start of the trial. 16 people completed one dose (8 oz) or more. Nine volunteers had multiple doses of 3 or more, 2 had 8 months of 1 to 2 doses per day. 14 volunteers recorded results after a single dose.

Ages ranged from 10 to 74 years.

There were 12 females and 5 males.

Results:

A) Safety

There were no adverse effects reported during this pilot study.

B) Efficacy

Of the 16 volunteers who completed a dose, all 16 observed a moisturizing effect from either a single or multiple dose for a 100% moisturizing effect observed.

Of the 14 volunteers who recorded results of a single dose, 14 of 14 reported a moisturizing effect for a 100% success rate.

Of the nine volunteers with multiple doses, nine reported a moisturizing effect for a 100% success rate.

For intent-to-treat analysis, 17 people volunteered and 16 of 17 completed a dose with moisturizing effect for a 94% success rate.

The key effects observed with a single dose (n=14) were:
Skin felt more moist n=12
Decreased thirst n=4
Enhanced effect of external moisturizers n=8
Increased eye moisture, aided contact lens use n=4
Nasal passages had increased moisture n=4
The key effects observed with multiple doses (n=9) were:
Promoted healing of bleeding skin cracks n=4
Skin felt smoother, moister n=5
Enhanced the effect of external moisturizers n=4
Helped promote healing of eczema n=1
Helped with contact lens use n=2

Other effects noted were:
increased salivation
effect of steam bath enhanced
face became more dewy, supple, moist (most striking effect)
overall body skin felt moister
fine wrinkles on chest under chin were lessened
hair less dry
vagina less dry
sense of energy, wellness.

The above effects were not accompanied by bloating or weight gain. Several volunteers had bleeding, painful skin cracks on fingers. The Beverage was credited by the users for the reduction or elimination of these cracks within one week. This pilot study provides substantiation that the Beverage helps hydrate the SC. Furthermore, the healing of bleeding skin cracks shows that the Beverage supports biological action at the living layers of the skin (epidermis and dermis).

The utility of the Beverage has also been demonstrated by market acceptance through commercial sales. A frequent statement by users who have been long-term dry skin sufferers is that no other method they have tried had worked for them, while the Beverage did.

ADVANTAGES OF THE PRESENT INVENTION

The Beverage is useful for maintaining healthy, moist, skin when skin dehydration is threatened by a number of potential causes. Among the latter are: a dry climate, exercise (including swimming), bathing in pools or hot tubs with chemicals, heating a home, travel in dry environments such as airplanes, trucks or cars, sudden changes in altitude (for example, visiting a ski area coming from a lower altitude), illness and aging. The invention is suitable for use in individual doses or long-term use, including over a year, depending on the motives of the user.

The water-retaining capacity of the SC is an important distinguishing characteristic between good (adequately hydrated) and dry (inadequately hydrated) skin. Dry skin is characterized by reduced water content in the SC. A change in water content of only a few percent of the SC significantly affects the properties of the skin. Skin dries as one ages, and the water content of the SC is decreased in aged skin. Ability of the SC to retain water is diminished with age. The skin (especially the SC or outer layers of the epidermis) provides barrier function and helps the body maintain body hydration. Water content of the SC influences barrier function. Water content of SC contributes to moist, supple skin. The Beverage counters water loss in aged skin.

The Beverage, as reduced to practice, tastes good. It is producible in several different formulations, including but not limited to the following: as a ready-to-drink liquid; as a dry mix (powder) which requires to be blended into water; as an easy-to-dissolve dry mix (powder); as a tablet which dissolves in water; and as a concentrate (syrup).

The Beverage uses the minimum amount of added ingredients to water that will maximize the hydration effect of water. The benefits include fewer calories, less sodium & electrolytes, less sugars and proteins. This is important as a low-calorie beverage can be better used by the typical consumer to frequently and/or continuously combat the effects of aging, dry climates and other dehydrating factors.

It should also be noted that the Beverage combines carbohydrates and protein, in roughly equal amount by weight, a combination not noted in other hydrating drinks. Table 1 above compares the formula for the Beverage to several protein and energy drinks. The smaller amount of calories and sodium are to be noted, a definite advantage for persons who do not need more calories or sodium.

A significant aspect of the Beverage is that it can be used in conjunction with external moisturizers, enhancing the effect of the latter.

Further advantages of the Beverage are indicated through customer feedback:

Customer Feedback

The Beverage has been available commercially as "HydroVi", "Hydro-Boost", "Specialite" and "SHD" since summer, 2000. Our estimate is that there have been over 300 different repeat users, supporting the invention's claim of skin hydration. Retailers include those in the health and beauty field and groceries. Within health and beauty, retailers include skin clinics, hair salons, masseurs and day spas. Reports from commercial users include the following effects of consumption of the Beverage:

Helps quench thirst; mouth is less dry; general hydration is improved
Softer skin overall (torso, hands, feet, face, legs)
Aids in healing skin cracks of fingers and feet and heals fissures
Aid in preventing and healing chapped lips
Reduces skin flakes & dry spots
Increases moisture for dry eyes; aids in contact lens use
Makes skin of face more moist & supple
Enhances the effect of external moisturizers
Makes hand's nail beds less dry
Increases vaginal moisture in perimenopausal/menopausal women
Helps moisturize mucous membranes in general: mouth, nasal passages, etc.
Helps skin dryness associated with rheumatoid arthritis, Shogren's disease, dermatitis An important customer feedback has been from a few persons who prepared the Beverage from its powder composition and did not follow directions to use water, but used high caloric liquids, some being Coca Cola and orange juice. They reported that the resulting drink did not alleviate their dry skin symptoms. This evidence reinforces the fact that the low concentration of sugar that is the basis of the present invention is critical for providing relief to dry skin sufferers using a sugar-protein-electrolyte beverage.

The introduction of the present invention has focused on human subjects, but there is nothing to indicate that its use would not be beneficial in a similar manner to other mammals. Accordingly, the scope of this application includes the use of the Beverage according to the regimen outlined above for the maintenance of moist skin in all mammals. The flavor would need to be adjusted to the preferences of individual animal species.

While the invention has been described in connection with preferred embodiments, it is not intended to limit the scope of the invention to the particular forms set forth. A latitude of modification, change and substitution is intended in the foregoing disclosure, intended to cover such alternatives, modifications, and equivalents as may be included within the spirit and scope of the invention as defined by the appended claims. In some instances, one or more aspects of the invention will be employed without the use of other corresponding aspects.

Example 1

The Beverage is Prepared by Combining the Ingredients Shown in the Table Below

| Ingredient | Weight, % of Total | Weight per 8 fl oz Beverage (g) |
|---|---|---|
| Water | 95.8 | 230 |
| Sugar | 1.73 | 4.15 |
| Protein | 1.52 | 3.65 |
| Phosphate | 0.13 | 0.314 |
| Aspartame-based sweetener (optional) | 0.10 | 0.23 |
| Potassium | 0.047 | 0.112 |
| Calcium | 0.032 | 0.075 |
| Chloride | 0.020 | 0.049 |
| Sodium | 0.013 | 0.032 |
| Vitamin C | 0.0035 | 0.008 |
| Magnesium | 0.0004 | 0.001 |

While the above-stated concentration of the ingredients in the total are considered the best course for the average user, the present invention includes extensions of the above formula by allowing variations in any or all ingredients except water of up to +/−35%. Thus, for example, a different embodiment of the present invention could be the formula above, except calcium weighing 0.1 gram per 8 fl oz of the Beverage, instead of weighing 0.075 gram.

Example 2

Dry Formulation

| Ingredient | Weight, % of Total | Weight per 8 fl oz Beverage (g) |
|---|---|---|
| Sugar | 41.3 | 4.15 |
| Protein | 36.3 | 3.65 |
| Phosphate | 3.1 | 0.314 |
| Aspartame-based sweetener (optional) | 2.5 | 0.23 |
| Potassium | 1.1 | 0.112 |
| Calcium | 0.75 | 0.075 |
| Chloride | 0.49 | 0.049 |
| Sodium | 0.32 | 0.032 |
| Vitamin C | 0.08 | 0.008 |
| Magnesium | 0.01 | 0.001 |

A skin-hydrating beverage can be prepared by adding 230 ml of water to the foregoing dry formulation and mixing thoroughly. While the above-stated concentration of the ingredients in the total are considered the best course for the average user, the present invention includes extensions of the above formula by allowing variations in any or all ingredients of up to +/−35%. Thus, for example, a different embodiment of the present invention could be the formula above, except calcium weighing 0.1 gram instead of weighing 0.075 gram.

Example 3

External Moisturizers

The following example illustrates the types of external moisturizers, which may be used concurrent with the Beverage of the invention.

The Beverage enhances and maximizes the beneficial effects of external moisturizers. The skin is suppler, moist, dewy and external moisturizers last longer. Examples of external moisturizers include Origins' "Urgent Moistures", Origins' "Steady Drencher", Origins' "Eye Doctor", Origins' "Drenching Solution", Chanel's "Creme No. 1 Skin Recovery", Chanel's "Precision, Anti-Dark Spot Serum", Chanel's Eye Cream, sunscreen "Banana Boat Ultra Sunblock 30 SPF", body lotions Desert Essence "Moisture Balancing Body Lotion", Avalon "Organic Botanicals", Lancome's "Tresor Perfumed Body Creme and Lotion", "Bag Balm", Kaloderma's "Kaloderma Body Hautcreme für trockene and empfindliche Haut" ("Kaloderma Body Skincream for dry and sensitive skin"), and sunblock "Rocky Mountain Moisturizing System SPF 30".

Example 4

Aspartame-Based Sweeteners

The following commercially available sweeteners are based on aspartame and may be used to complement other ingredients in the present invention: Equal®, Equal® Spoonful, NatraTaste® and NutraSweet®.

What is claimed is:

1. In a nutritional composition for hydrating skin cells in human beings, the composition consisting of ingredients a-k:
   a. 230 milliliters of water
   b. 4.15 grams of sugar
   c. 3.65 grams of protein
   d. 0.314 grams of phosphate
   e. 0.23 grams of aspartame-based sweetener (optional)
   f. 0.112 grams of potassium
   g. 0.075 grams of calcium
   h. 0.049 grams of chloride
   i. 0.032 grams of sodium
   j. 0.008 grams of Vitamin C
   k. 0.001 grams of magnesium,
   wherein the improvement consists of the use of both protein and sugar, in a ratio of 1.1 to 1 of sugar to protein.

2. The nutritional fluid composition of claim 1 wherein the protein used is whey protein.

3. The nutritional fluid composition of claim 1 applied to mammals, including human beings.

4. The nutritional fluid composition of claim 2 applied to mammals, including human beings.

* * * * *